(12) United States Patent
Sip

(10) Patent No.: US 9,052,884 B2
(45) Date of Patent: Jun. 9, 2015

(54) DEVICE FOR ADJUSTING POWER CONSUMPTION AND METHOD THEREOF

(75) Inventor: Kim Yeung Sip, New Taipei (TW)

(73) Assignee: Acer Incorporated, New Taipei (TW)

(*) Notice: Subject to any disclaimer, the term of this patent is extended or adjusted under 35 U.S.C. 154(b) by 347 days.

(21) Appl. No.: 13/559,596

(22) Filed: Jul. 27, 2012

(65) Prior Publication Data

US 2013/0166925 A1 Jun. 27, 2013

Related U.S. Application Data

(60) Provisional application No. 61/578,848, filed on Dec. 21, 2011.

(30) Foreign Application Priority Data

Apr. 3, 2012 (TW) .............................. 101111873 A

(51) Int. Cl.
*G06F 1/26* (2006.01)
*G06F 1/32* (2006.01)

(52) U.S. Cl.
CPC ................ *G06F 1/26* (2013.01); *G06F 1/3218* (2013.01); *G06F 1/3265* (2013.01); *G06F 1/3206* (2013.01)

(58) Field of Classification Search
CPC ....... G06F 1/26; G06F 1/3206; G06F 1/3218; G06F 1/3265

USPC ................ 713/300, 320, 322, 323, 324, 330; 345/52, 211

See application file for complete search history.

(56) References Cited

U.S. PATENT DOCUMENTS 5,384,516 A * 1/1995 Kawabata et al. ............ 315/160
2011/0057936 A1* 3/2011 Gotwalt et al. ............... 345/504

FOREIGN PATENT DOCUMENTS

| CN | 2630926 Y | 8/2004 |
|---|---|---|
| CN | 101414208 A | 4/2009 |
| CN | 101571743 A | 11/2009 |
| TW | 525063 | 3/2003 |
| TW | 200421083 | 10/2004 |
| TW | 200509530 | 3/2005 |
| TW | 201042573 | 12/2010 |

* cited by examiner

*Primary Examiner* — Michael J Brown
(74) *Attorney, Agent, or Firm* — Jianq Chyun IP Office

(57) ABSTRACT

A device and a method for adjusting power consumption are provided. The method is adapted for adjusting power consumption of an external graphic processing unit (GPU) according to different voltage sources and includes following steps: determining whether power to the external GPU is supplied by a first voltage source or a second voltage source according to a comparison result of an input voltage of the external GPU and a default reference voltage. If the input voltage is higher than or equal to the default reference voltage, power to the external GPU is supplied by the first voltage source, and the external GPU is controlled to remain in a normal speed operation status. If the input voltage is lower than the default reference voltage, power to the external GPU is supplied by the second voltage source, and the external GPU is controlled to remain in a low speed operation status.

11 Claims, 3 Drawing Sheets

DEVICE FOR ADJUSTING POWER CONSUMPTION AND METHOD THEREOF

CROSS-REFERENCE TO RELATED APPLICATION

This application claims the priority benefits of U.S. provisional application Ser. No. 61/578,848, filed on Dec. 21, 2011 and Taiwan application serial no. 101111873, filed on Apr. 3, 2012. The entirety of each of the above-mentioned patent applications is hereby incorporated by reference herein and made a part of this specification.

BACKGROUND OF THE INVENTION

1. Field of the Invention

The invention relates to a device and a method for adjusting power consumption. More particularly, the invention relates to a device and a method for adjusting power consumption of an external graphic processing unit (GPU) according to different voltage sources.

2. Description of Related Art

At present, various existing computer operating systems significantly rely on graphic processing interfaces. Namely, if a GPU unexpectedly fails to execute calculation, the entire operating system may crash. The failure of the GPU to execute calculation may result from sudden termination of power supply from the voltage source that provides power to the GPU. For instance, if a power cord is suddenly pulled out or falls out, or power failure occurs, then the GPU is not able to further execute calculation and the computer operating system may crash. At this time, the application program may be in process of execution. For instance, if the operating system suddenly crashes while a user is editing a document file with use of document editing software, the document file cannot be timely saved due to the sudden termination of power supply, which may cause irreparable damages.

SUMMARY OF THE INVENTION

The invention is directed to a device for adjusting power consumption, and the device is adapted for adjusting power consumption of an external GPU according to different voltage sources. According to an embodiment of the invention, the device includes a determination module and a control unit. The determination module determines whether power to the GPU unit is supplied by a first voltage source or a second voltage source of the voltage sources according to a comparison result of an input voltage input to the external GPU and a default reference voltage. If the input voltage is greater than or equal to the default reference voltage, the determination module determines that the power to the external GPU is supplied by the first voltage source; if the input voltage is lower than the default reference voltage, the determination module determines that the power to the external GPU is supplied by the second voltage source. The control unit is coupled to the determination module. When the power to the external GPU is determined to be supplied by the first voltage source, the control unit controls the external GPU to remain in a normal speed operation status; when the power to the external GPU is determined to be supplied by the second voltage source, the control unit controls the external GPU to remain in a low speed operation status.

According to an embodiment of the invention, the determination module includes a first diode, a second diode, and a comparator. An anode of the first diode is coupled to the first voltage source, and a cathode of the first diode is coupled to the external GPU. An anode of the second diode is coupled to the second voltage source, and a cathode of the second diode is coupled to the external GPU. A first input end of the comparator is coupled to the input voltage input to the external GPU, and a second input end of the comparator is coupled to the default reference voltage. If the input voltage is higher than or equal to the default reference voltage, the comparator determines that the power to the external GPU is supplied by the first voltage source; if the input voltage is lower than the default reference voltage, the comparator determines that the power to the external GPU is supplied by the second voltage source.

According to an embodiment of the invention, the first voltage source is a stable alternating current (AC) voltage source, and the stable AC voltage source outputs a direct-current (DC) voltage to the GPU through an AC-DC adapter.

According to an embodiment of the invention, the second voltage source is a computer apparatus, and the computer apparatus outputs a cable voltage to the external GPU through a thunderbolt cable.

According to an embodiment of the invention, the control unit further controls the external GPU to suspend calculation executed by at least one application program consuming considerable computing resources when the power to the external GPU is determined to be supplied by the second voltage source.

According to an embodiment of the invention, the control unit controls a display screen of the computer apparatus to display a warning message to remind a user that the power to the external GPU is supplied by the second voltage source when a status of the external GPU is changed from the normal speed operation status to the low speed operation status.

The invention is further directed to a method for adjusting power consumption, and the method is adapted for adjusting power consumption of an external GPU according to different voltage sources. The method includes following steps: determining whether power to the external GPU is supplied by a first voltage source or a second voltage source of the voltage sources according to a comparison result of an input voltage input to the external GPU and a default reference voltage. When the input voltage is greater than or equal to the default reference voltage, the power to the external GPU is determined to be supplied by the first voltage source, and the external GPU is controlled to remain in a normal speed operation status. When the input voltage is lower than the default reference voltage, the power to the external GPU is determined to be supplied by the second voltage source, and the external GPU is controlled to remain in a low speed operation status.

Based on the above, the device and the method for adjusting power consumption described in the embodiments of the invention are capable of adjusting power consumption of an external GPU according to different voltage sources. If the voltage source is a stable AC voltage source, the external GPU remains in a normal speed operation status; if the voltage source is converted to a cable voltage supplied by a computer apparatus, the external GPU converts to a low speed operation status accordingly.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1A:
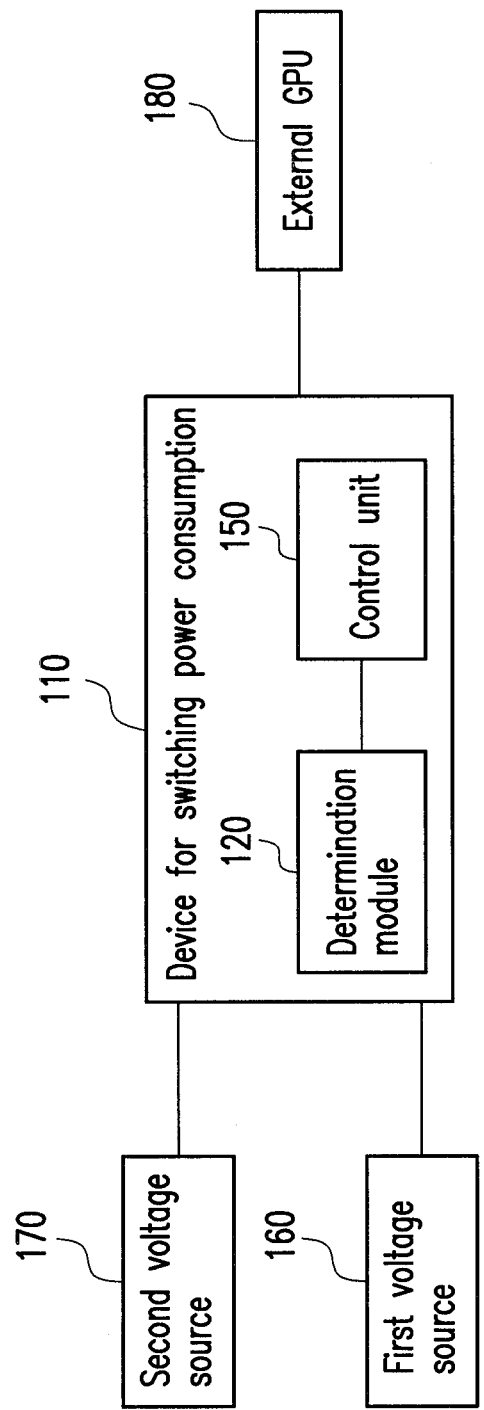
FIG. 1A is a block diagram illustrating functions of a device for adjusting power consumption according to an embodiment of the invention.

FIG. 1A is a block diagram illustrating functions of a device for adjusting power consumption according to an embodiment of the invention. The device 110 for adjusting power consumption is adapted for adjusting power consumption of an external GPU 180 according to different voltage sources. Here, the device 110 for adjusting power consumption includes a determination module 120 and a control unit 150. The determination module 120 determines whether power to the external GPU 180 is supplied by a first voltage source 160 or a second voltage source 170 according to a comparison result of an input voltage input to the external GPU 180 and a default reference voltage. As to the control unit 150, it should be mentioned that functions of the control unit 150 may be achieved by applying a software program, a hardware circuit, or a firmware. Here, the control unit 150 is coupled to the determination module 120 and determines the way to control the execution speed of the external GPU 180 according to the determination result of the determination module 120.

Figure 1B:
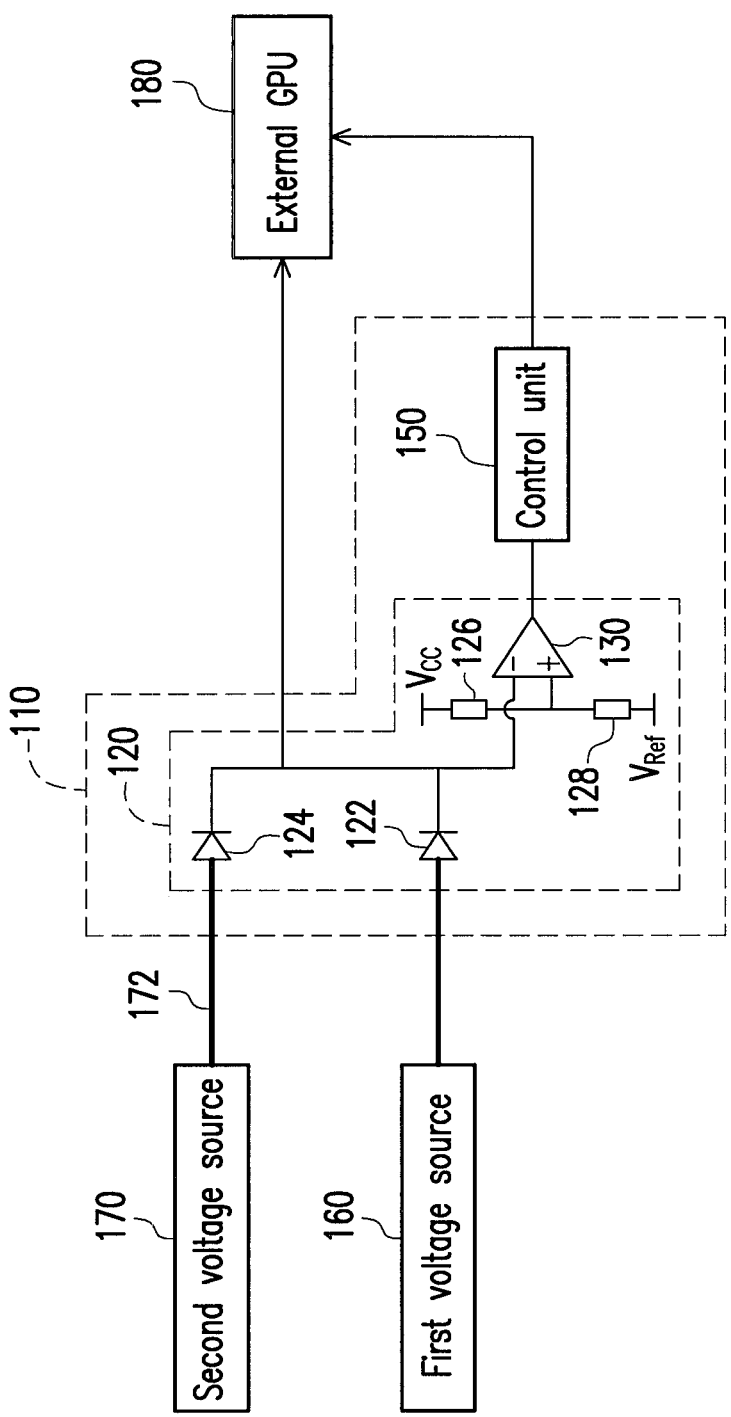
FIG. 1B is a block diagram illustrating functions of a device for adjusting power consumption according to another embodiment of the invention.

FIG. 1B is a block diagram illustrating functions of a device for adjusting power consumption according to an embodiment of the invention, and the structure of the device depicted herein is similar to that depicted in FIG. 1A. According to the present embodiment shown in FIG. 1B, the first voltage source 160 is a stable AC voltage source, and the stable AC voltage source outputs a DC voltage to the external GPU 180 through an AC-DC adapter. The second voltage source 170 is a computer apparatus, and the computer apparatus outputs a cable voltage to the external GPU 180 through a thunderbolt cable 172. The determination module 120 includes a first diode 122, a second diode 124, voltage-dividing resistors 126 and 128, and a comparator 130.

Figure 2:
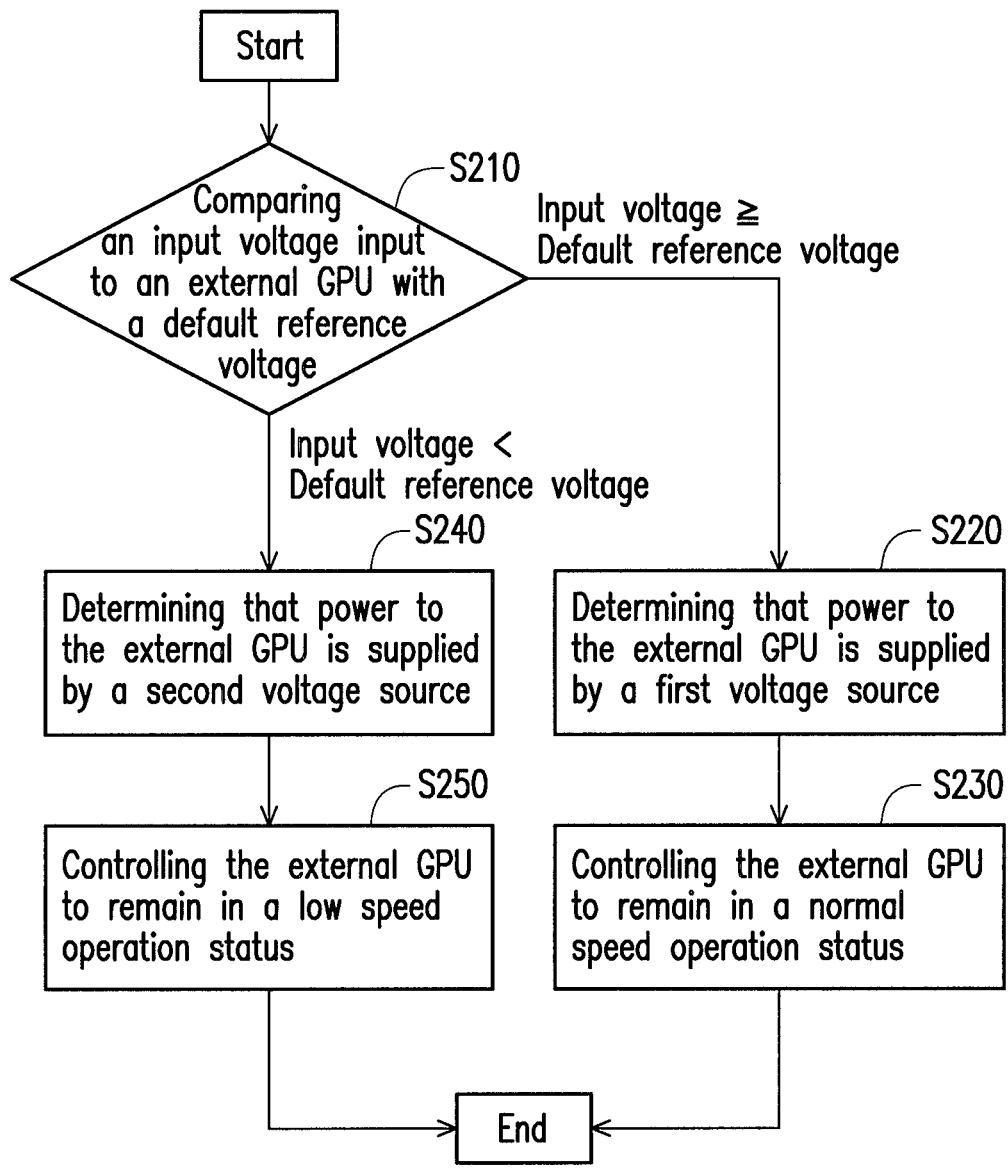
FIG. 2 is a flow chart illustrating a method for adjusting power consumption according to an embodiment of the invention.

FIG. 2 is a flow chart illustrating a method for adjusting power consumption according to an embodiment of the invention. Note that the method shown in FIG. 2 is applicable to the devices respectively shown in FIG. 1A and FIG. 1B. The embodiment shown in FIG. 1B is provided below to describe some features of the invention. Please refer to FIG. 1B and FIG. 2 together.

In the determination module 120 shown in FIG. 1B, an anode of the first diode 122 is coupled to the first voltage source 160, and a cathode of the first diode 122 is coupled to the external GPU 180. An anode of the second diode 124 is coupled to the second voltage source 170, and a cathode of the second diode 124 is coupled to the external GPU 180. That is to say, the input voltage of the external GPU 180 may be supplied by the first voltage source 160 through the first diode 122 or the second voltage source 170 through the second diode 124. In the method described in an embodiment of the invention, the determination module 120 is applied to compare the input voltage input to the external GPU 180 with a default reference voltage (step S210). A first input end of the comparator 130 is coupled to the input voltage input to the external GPU 180, and a second input end of the comparator 130 is coupled to the default reference voltage $V_{Ref}$. If the input voltage is higher than or equal to the default reference voltage $V_{Ref}$, the comparator 130 determines that the power to the external GPU 180 is supplied by the first voltage source 160 (step S220).

For instance, the input voltage supplied by the first voltage source 160 is 19V, the input voltage supplied by the second voltage source 170 is 12V, and the default reference voltage $V_{Ref}$ is 13V. Under normal circumstances, the first voltage source 160 and the second voltage source 170 are in the ON state. Since the voltage supplied by the first voltage source 160 is higher than the voltage supplied by the second voltage source 170, the first diode 122 is switched on, and the power to the external GPU 180 is supplied by the first voltage source 160. At this time, the input voltage input to the external GPU 180 is 19V, and so is the voltage 19V coupled to the first input end of the comparator 130. The comparator 130 compares the voltage (19V) coupled to the first input end with the default reference voltage $V_{Ref}$ (13V). Since 19V is higher than 13V, the comparator 130 determines that the power to the external GPU 180 is supplied by the first voltage source 160. The control unit 150 controls the external GPU 180 to remain in a normal speed operation status (step S230). That is to say, at this time, the power is supplied by the stable AC voltage source, and thus the external GPU 180 can still remain in a normal speed operation status.

On the contrary, if the first voltage source 160 can no longer supply power, the second diode 124 is switched on, and the power to the external GPU 180 is supplied by the second voltage source 170. At this time, the input voltage of the external GPU 180 is 12V, and so is the voltage 12V coupled to the first input end of the comparator 130. The comparator 130 compares the voltage (12V) coupled to the first input end with the default reference voltage $V_{Ref}$ (13V) coupled to the second input end. Since 12V is lower than 13V, the comparator 130 determines that the power to the external GPU 180 is supplied by the second voltage source 170 (step S240). The control unit 150 controls the external GPU 180 to remain in or converts to a low speed operation status (step S250). That is to say, at this time, the power is supplied by the computer apparatus, and thus the execution speed of the external GPU 180 need be lowered down.

When the power to the external GPU 180 is supplied by the second voltage source 170, the control unit 150 controls the external GPU 180 to suspend calculation executed by at least one application program consuming considerable computing resources because the voltage supplied by the second voltage source 170 is relatively low.

According to an embodiment of the invention, the control unit 150 controls a display screen of the second voltage source 170 (i.e., the computer apparatus) to display a warning message to remind a user that the power to the external GPU 180 is supplied by the second voltage source 170. This warning message allows the user to resume the normal power supply form the first voltage source 160 as soon as possible, such that the external GPU 180 is likely to remain in the normal speed operation status.

In light of the foregoing, the device and the method for adjusting power consumption as described in the embodiments of the invention are capable of adjusting power consumption of an external GPU according to different voltage sources. If the voltage source is a stable AC voltage source, the external GPU remains in a normal speed operation status; if the voltage source is converted to a cable voltage supplied by a computer apparatus, the external GPU remains in a low speed operation status. Moreover, as described in an embodiment of the invention, the warning message reminds a user that the power to the external GPU is supplied by the cable voltage from the computer apparatus, and that the normal power supply from the stable AC voltage source need be retained as long as the external GPU is expected to remain in the normal speed operation status.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A method for adjusting power consumption, the method being adapted for a device for adjusting power consumption of an external graphic processing unit according to different voltage sources and comprising:
   determining whether power to the external graphic processing unit is supplied by a first voltage source or a second voltage source of the voltage sources according to a comparison result of an input voltage input to the external graphic processing unit and a default reference voltage, wherein the power to the external graphic processing unit is determined to be supplied by the first voltage source if the input voltage is higher than or equal to the default reference voltage, and the power to the external graphic processing unit is determined to be supplied by the second voltage source if the input voltage is lower than the default reference voltage;
   wherein the second voltage source is a computer apparatus, and the external graphic processing unit is externally connected to the computer apparatus through the device for adjusting power consumption of the external graphic processing unit,
   the external graphic processing unit being controlled to remain in a normal speed operation status when the power to the external graphic processing unit is determined to be supplied by the first voltage source; and
   the external graphic processing unit being controlled to remain in or convert to a low speed operation status when the power to the external graphic processing unit is determined to be supplied by the second voltage source.

2. The method as recited in claim 1, wherein the first voltage source is a stable alternating current voltage source, and the stable alternating current voltage source outputs a direct-current voltage to the external graphic processing unit through an alternating current-direct current adapter.

3. The method as recited in claim 1, wherein the second voltage source is a computer apparatus, and the computer apparatus outputs a cable voltage to the external graphic processing unit through a thunderbolt cable.

4. The method as recited in claim 1, further comprising:
   controlling the external graphic processing unit to suspend calculation executed by at least one application program consuming considerable computing resources when the power to the external graphic processing unit is determined to be supplied by the second voltage source.

5. The method as recited in claim 3, further comprising:
   when a status of the external graphic processing unit is changed from the normal speed operation status to the low speed operation status, a display screen of the computer apparatus displays a warning message to remind a user that the power to the external graphic processing unit is supplied by the second voltage source.

6. A device for adjusting power consumption, the device being adapted for adjusting power consumption of an external graphic processing unit according to different voltage sources and comprising:
   a determination module determining whether power to the external graphic processing unit is supplied by a first voltage source or a second voltage source of the voltage sources according to a comparison result of an input voltage input to the external graphic processing unit and a default reference voltage, wherein the determination module determines that the power to the external graphic processing unit is supplied by the first voltage source if the input voltage is higher than or equal to the default reference voltage, and the determination module determines that the power to the external graphic processing unit is supplied by the second voltage source if the input voltage is lower than the default reference voltage; and
   a control unit coupled to the determination module, wherein the control unit controls the external graphic processing unit to remain in a normal speed operation status when the power to the external graphic processing unit is determined to be supplied by the first voltage source, and the control unit controls the external graphic processing unit to remain in or convert to a low speed operation status when the power to the external graphic processing unit is determined to be supplied by the second voltage source,
   wherein the second voltage source is a computer apparatus, and the external graphic processing unit is externally connected to the computer apparatus through the device for adjusting power consumption of the external graphic processing unit.

7. The device as recited in claim 6, wherein the determination module comprises:
   a first diode, an anode of the first diode being coupled to the first voltage source, a cathode of the first diode being coupled to the external graphic processing unit;
   a second diode, an anode of the second diode being coupled to the second voltage source, a cathode of the second diode being coupled to the external graphic processing unit; and
   a comparator, a first input end of the comparator being coupled to the input voltage input to the external graphic processing unit, a second input end of the comparator being coupled to the default reference voltage, wherein the comparator determines that the power to the external graphic processing unit is supplied by the first voltage source if the input voltage is higher than or equal to the default reference voltage, and the comparator determines that the power to the external graphic processing unit is supplied by the second voltage source if the input voltage is lower than the default reference voltage.

8. The device as recited in claim 6, wherein the first voltage source is a stable alternating current voltage source, and the stable alternating current voltage source outputs a direct-current voltage to the external graphic processing unit through an alternating current-direct current adapter.

9. The device as recited in claim 6, wherein the second voltage source is a computer apparatus, and the computer apparatus outputs a cable voltage to the external graphic processing unit through a thunderbolt cable.

10. The device as recited in claim 6, wherein the control unit further controls the external graphic processing unit to suspend calculation executed by at least one application program consuming considerable computing resources when the power to the external graphic processing unit is determined to be supplied by the second voltage source.

11. The device as recited in claim 9, wherein the control unit controls a display screen of the computer apparatus to display a warning message to remind a user that the external graphic processing unit is supplied by the second voltage source when a status of the external graphic processing unit is changed from the normal speed operation status to the low speed operation status.

* * * * *